United States Patent [19]

Nageswaran

[11] Patent Number: 5,991,792
[45] Date of Patent: Nov. 23, 1999

[54] METHOD, APPARATUS AND COMPUTER PROGRAM PRODUCT FOR DYNAMICALLY MANAGING A THREAD POOL OF REUSABLE THREADS IN A COMPUTER SYSTEM

[75] Inventor: Parthasarathy Nageswaran, Rochester, Minn.

[73] Assignee: International Business Machines Corporation, Armonk, N.Y.

[21] Appl. No.: 09/002,530

[22] Filed: Jan. 2, 1998

[51] Int. Cl.$^6$ ........................................................ G06F 9/00
[52] U.S. Cl. ............................................. 709/102; 709/104
[58] Field of Search ..................................... 709/100, 102, 709/103, 104, 107

[56] References Cited

U.S. PATENT DOCUMENTS

| | | |
|---|---|---|
| 5,063,500 | 11/1991 | Shorter . |
| 5,440,692 | 8/1995 | Janicek . |
| 5,481,719 | 1/1996 | Ackerman et al. . |
| 5,504,898 | 4/1996 | Klein . |
| 5,515,538 | 5/1996 | Kleiman . |
| 5,535,393 | 7/1996 | Reeve et al. . |
| 5,606,696 | 2/1997 | Ackerman et al. . |

OTHER PUBLICATIONS

IBM Technical Disclosure Bulletin, vol. 36, No. 06A, Jun. 1993, pp. 379 & 380, "Dynamic Filed Splitting, Asynchronus Disk–Access Method to Maximize I/O Throughput for Multimedia System".

IBM Technical Disclosure Bulletin, vol. 37, No. 11, Nov. 1994, pp. 261 & 262, "Efficient Method of Providing Memory Buffer Physical Addresses".

IBM Technical Disclosure Bulletin, vol. 38, No. 05, May 1995, pp. 199 & 200, "Control of Dynamic Threads Pool for Concurrent Remote Procedure Calls".

1996 International Conference on Parallel Processing, 1996, pp. 174–181, "Task Spreading and Shrinking on a Network of Workstations with Various Edge Classes".

*Primary Examiner*—Majid A. Banankhah
*Attorney, Agent, or Firm*—Joan Pennington

[57] ABSTRACT

A method, apparatus and computer program product are provided for dynamically managing a thread pool of reusable threads in a computer system. A thread manager is provided for managing the plurality of reusable threads. The thread manager maintains a count value of a number of the reusable threads in the thread pool and a thread use ratio value. The thread use ratio value is compared with a predefined threshold value. Responsive to the thread use ratio value greater than the predefined threshold value, the number of the reusable threads in the thread pool are reduced. The thread reduction process includes a two-phased fixed point iterative dynamic mechanism that is preemptable. In a first phase, reusable threads are identified and marked for removal from the thread pool; and in a second phase marked reusable threads are removed.

18 Claims, 6 Drawing Sheets

5,991,792

METHOD, APPARATUS AND COMPUTER PROGRAM PRODUCT FOR DYNAMICALLY MANAGING A THREAD POOL OF REUSABLE THREADS IN A COMPUTER SYSTEM

FIELD OF THE INVENTION

The present invention relates to the data processing field, and more particularly, relates to a method, apparatus and computer program product for dynamically managing a thread pool of reusable threads in a computer system.

DESCRIPTION OF THE RELATED ART

Some servers create a new thread to process a request and then release the thread. Creating and deleting threads to handle each method request coming into a server can degrade system performance. Servers that process reusable threads can provide improved system performance.

Thread pools of reusable threads that are managed by a server thread manager can grow dynamically depending on the number of requests being served by the server. When the number of requests coming to the server shrinks, the thread manager needs to dynamically adjust or shrink the thread pool. Otherwise, the server pays the price of maintaining system resources for no good reason. A mechanism for shrinking the thread pool dynamically without affecting server performance or response time is critical to keep the server from having to manage resources unnecessarily which could compromise the reliability and availability of the server.

A need exists for an effective mechanism for dynamically managing a thread pool of reusable threads.

SUMMARY OF THE INVENTION

A principal object of the present invention is to provide a method, apparatus and computer program product dynamically managing a thread pool of reusable threads in a computer system. Other important objects of the present invention are to provide such method, apparatus and computer program product for dynamically managing a thread pool of reusable threads substantially without negative effect and that overcome many of the disadvantages of prior art arrangements.

In brief, a method, apparatus and computer program product are provided for dynamically managing a thread pool of reusable threads in a computer system. A thread manager is provided for managing the plurality of reusable threads. The thread manager maintains a count value of a number of the reusable threads in the thread pool and a thread use ratio value. The thread use ratio value is compared with a predefined threshold value. Responsive to the thread use ratio value greater than the predefined threshold value, the number of the reusable threads in the thread pool are reduced. The thread reduction process includes a two-phase fixed point iterative dynamic mechanism that is pre-emptable. In a first phase, reusable threads are identified and marked for removal from the thread pool; and in a second phase marked reusable threads are removed.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
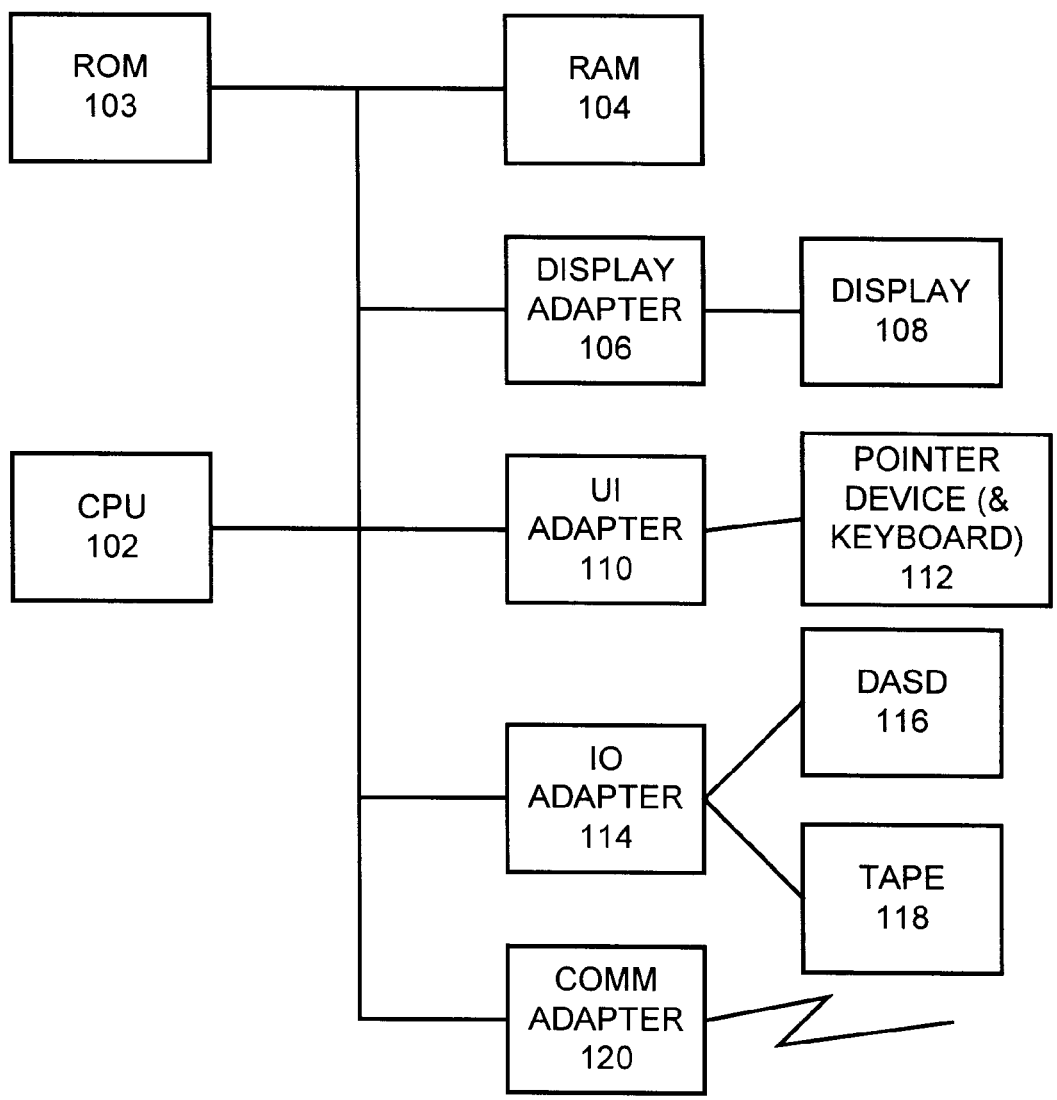
FIGS. 1A and 1B are block diagram representations illustrating a computer system and operating system for implementing a method for thread pool management in accordance with the preferred embodiment.
Figure 1B:
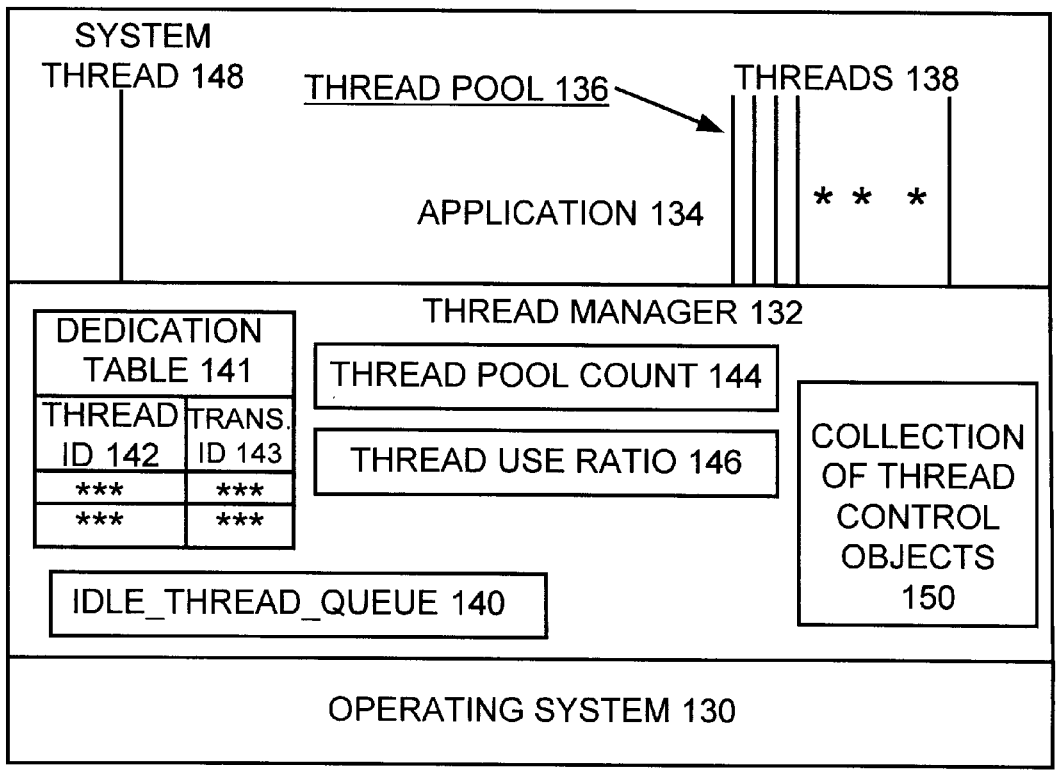

Having reference now to the drawings, in FIGS. 1A and 1B, there is shown a server computer or data processing system of the preferred embodiment generally designated by the reference character 100. As shown in FIG. 1A, server computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function.

As shown in FIG. 1B, server computer system 100 includes an operating system 130 and a middleware operating layer including a thread manager 132 of the preferred embodiment. An application 134 and a thread pool 136 of a plurality of reusable threads 138 are supported by the operating system 130 including the thread manager 132. The thread manager 132 maintains an idle thread queue 140 that contains a thread ID for all idle reusable threads 138. The thread manager 132 maintains a dedication table 141 storing a dedicated thread ID 142 with a particular client or transaction ID 143. The thread manager 132 dynamically maintains a total thread pool count 144 and a thread use ratio 146 of the number of requests being processed to the number of threads 138 in the thread pool 136. A system thread 148 is used in implementing a method for thread pool management in accordance with the preferred embodiment.

Various commercially available processors could be used for computer system 100, for example, an IBM personal computer, similar workstation or mainframe computer can be used. Central processor unit 102 is suitably programmed to execute the flowcharts of FIGS. 2, 3 and 4 of the preferred embodiment.

Figure 1C:
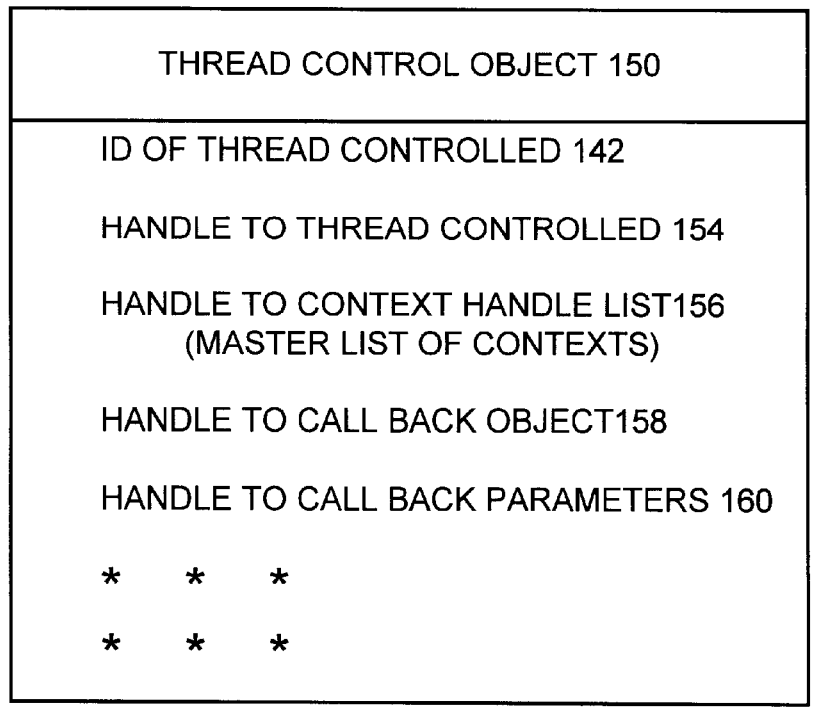
FIG. 1C is a block diagram representation illustrating a thread control object in accordance with the preferred embodiment.

Referring to FIG. 1C, an exemplary thread control object 150 in accordance with the preferred embodiment. For each reusable thread 138 in the server system 100, there is an associated thread control object (TCO) 150. Each thread 138 is a section of code, for example, a sequence of instructions or thread function. TCO 150 contains the ID of thread controlled 142, a thread pointer or handle to the thread controlled 154, a handle to a context handle list 156 which is a master list of contexts, a handle to callback object 158 and a handle to callback parameters 160. The thread ID 142 is a unique number associated with every thread 138. At runtime, by accessing the thread control object 150 and replacing the handle to the callback object 158 with another handle, the thread 138 is reused to run different code.

In accordance with features of the invention, a two-phase fixed point iterative dynamic thread pool reduction method is used for managing a thread pool of reusable threads. When the server thread manager 132 determines that the of the number of reusable threads 138 in the thread pool 136 to the number of requests being processed or the thread use ratio 146 is high, then the server thread manager 132 commences the process of reducing the number of threads 138 in the thread pool 136.

The server thread manager 132 maintains the thread pool 136 of reusable threads 138 that are ready to run. The initial number of reusable threads 138 in the pool 136 is a configurable parameter. As the number of requests increases, the server thread manager 132 dynamically increases the number of threads 138 in order to be able to keep up with the requests. At any given time the thread manager 132 of the server system 100 maintains a set of values, such as the number 144 of threads in the thread pool 136, the number of idle threads in the idle thread queue 140 and hence the number of busy threads. This count is the same as the number of methods being processed by the server currently. The threads 138 in the thread pool 136 of the server are only allocated for method requests.

Figure 2:
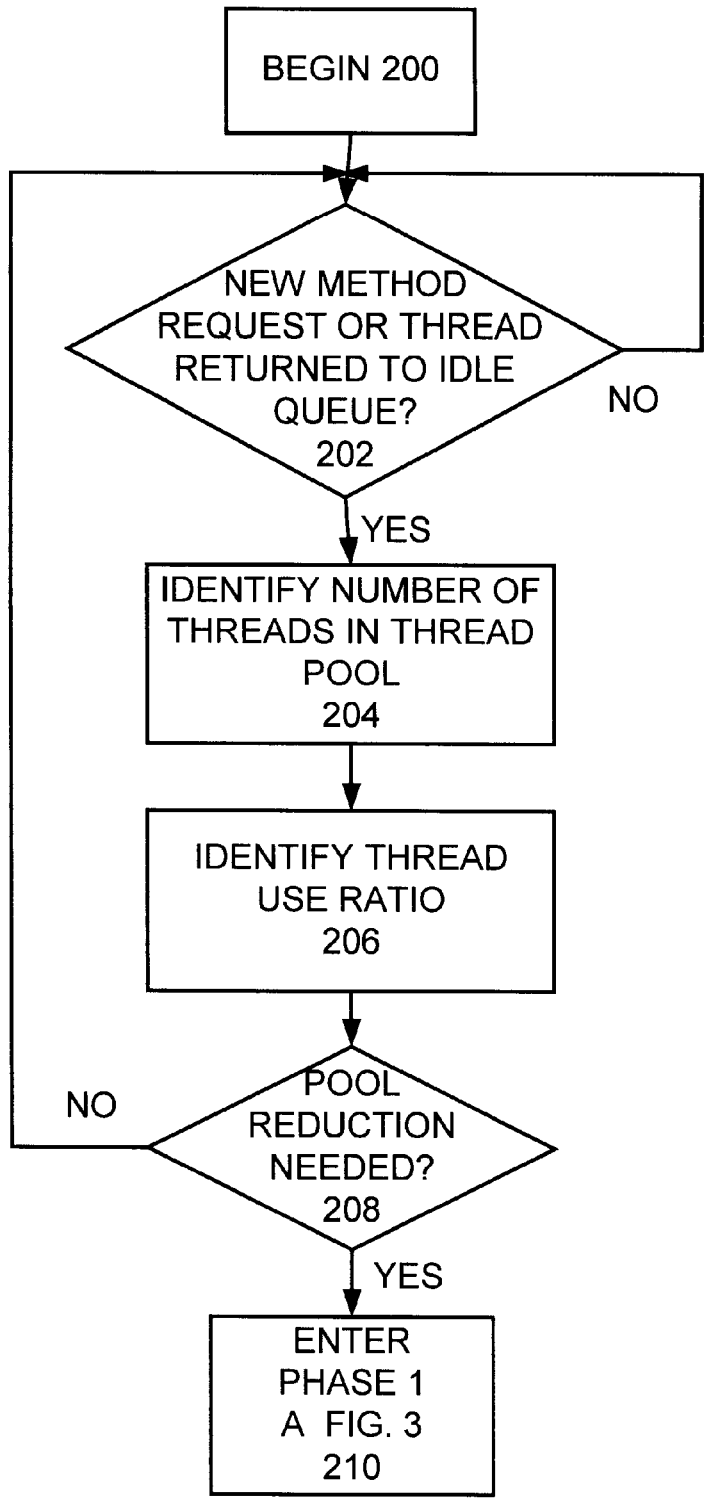
FIG. 2 is a flow chart illustrating exemplary sequential steps performed by a thread manager of FIG. 1B for checking a thread use ratio in accordance with the preferred embodiment.

Referring to FIG. 2, there are shown sequential steps performed by the thread manager 132 for periodically checking the ratio 146 of the total number of threads to the number of method requests being processed, without wasting CPU time. Whenever a new method request is being processed or a method request is completed and a thread is returned to the thread pool as indicated at a decision block 202, the thread manager 132 has to access state variables to update them and the number 144 of threads in the thread pool is identified as indicated at a block 204. At this stage, since it is already accessing these values, the thread manager 132 determines the thread use ratio 146 as indicated at a block 206. This step does not require the thread manager 132 to have another thread periodically pooling the server to compute the ratio, hence wasting valuable CPU cycles is avoided. Then checking whether thread pool reduction is needed is performed as indicated at a decision block 208.

Once the thread manager 132 has determined that the thread pool has indeed grown a lot and the requests have shrunk then it enters phase 1 of the two phase shrinkage process. In the preferred embodiment, this entire task is performed on the separate system thread 148, not a server thread pool thread 138 so that the servers ability to service requests is not affected.

Figure 3:
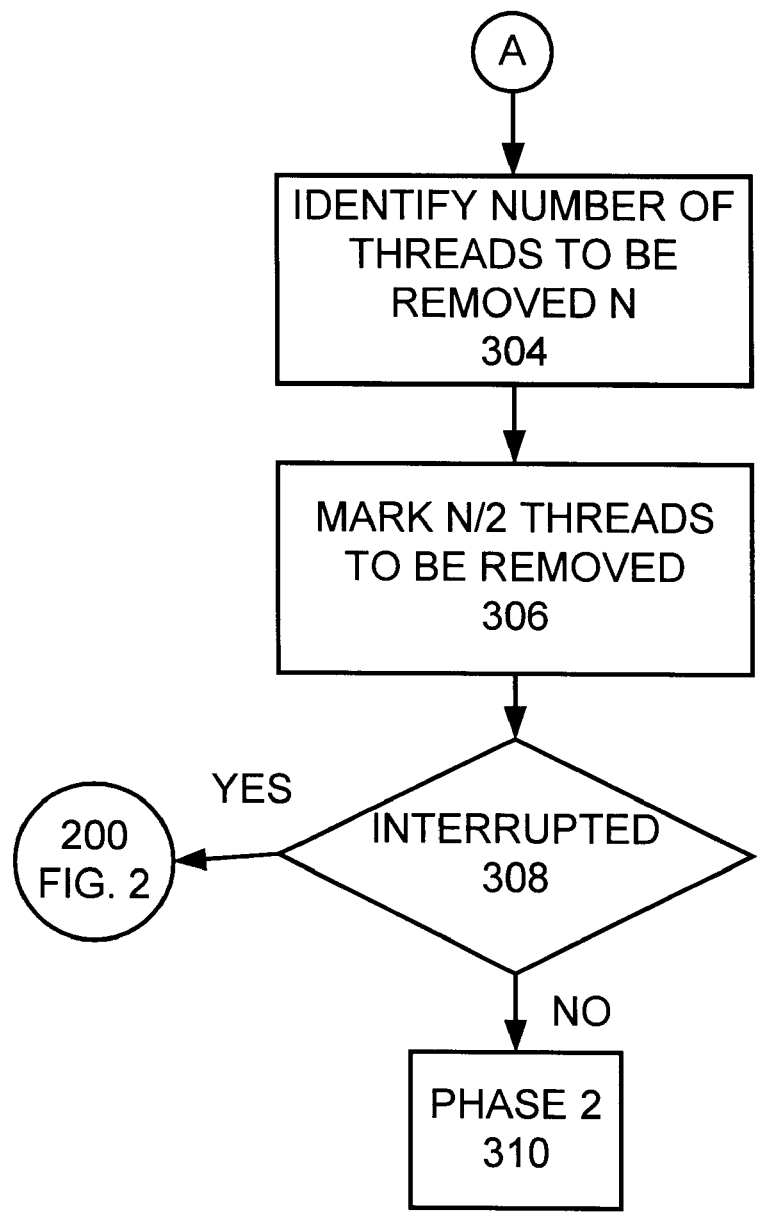
FIG. 3 is a flow chart illustrating exemplary sequential steps performed by a thread manager of FIG. 1B for a phase one of a dynamic thread pool reduction process in accordance with the preferred embodiment.

Referring to FIG. 3, in phase 1, the thread manager 132 determines how many threads have to be released. Since the performance of the server should not be affected, the thread pool reduction process uses a fixed-point iteration mechanism. Ideally, the shrinkage should result in the reduction of threads down to a configured minimum number of threads 138 in the pool 136, if and only if the number of requests is below the number of minimum threads in the thread pool 136, for example, as determined at decision block 208 in FIG. 2. For example, assume the thread manager 132 has identified that the size to be shrunk to is a minimum number X of threads 138 and that there are a total number Y (144) of threads 138 in the pool 136. During the first phase, the server thread manager 132 attempts to reduce the threads by (Y−X)/2. Having determined this number as indicated at a block 304, the server thread manager 132 will then set out to identify and mark this many threads 183 in the thread pool 136 to be deleted as indicated at a block 306. All threads 138 currently marked as in use are obviously not eligible to be deleted. Threads 138 that are not dedicated for any particular transaction and are idle are prime candidates to be released. The thread manager 132 identifies these threads and marks their state as Being Removed. It should be understood that threads 138 that are in the Being Removed state can still be reused, for example, if the thread manager 132 gets a spurt of requests that it has to service and that the thread has not yet been released. It is to be noted that if the number of available threads that can be marked for being removed, Z, is less than (Y−X)/2, then the Z threads will be removed in one iteration, barring interruption, and the reduction process terminated. The thread reduction process is a two phased solution.

Figure 4:
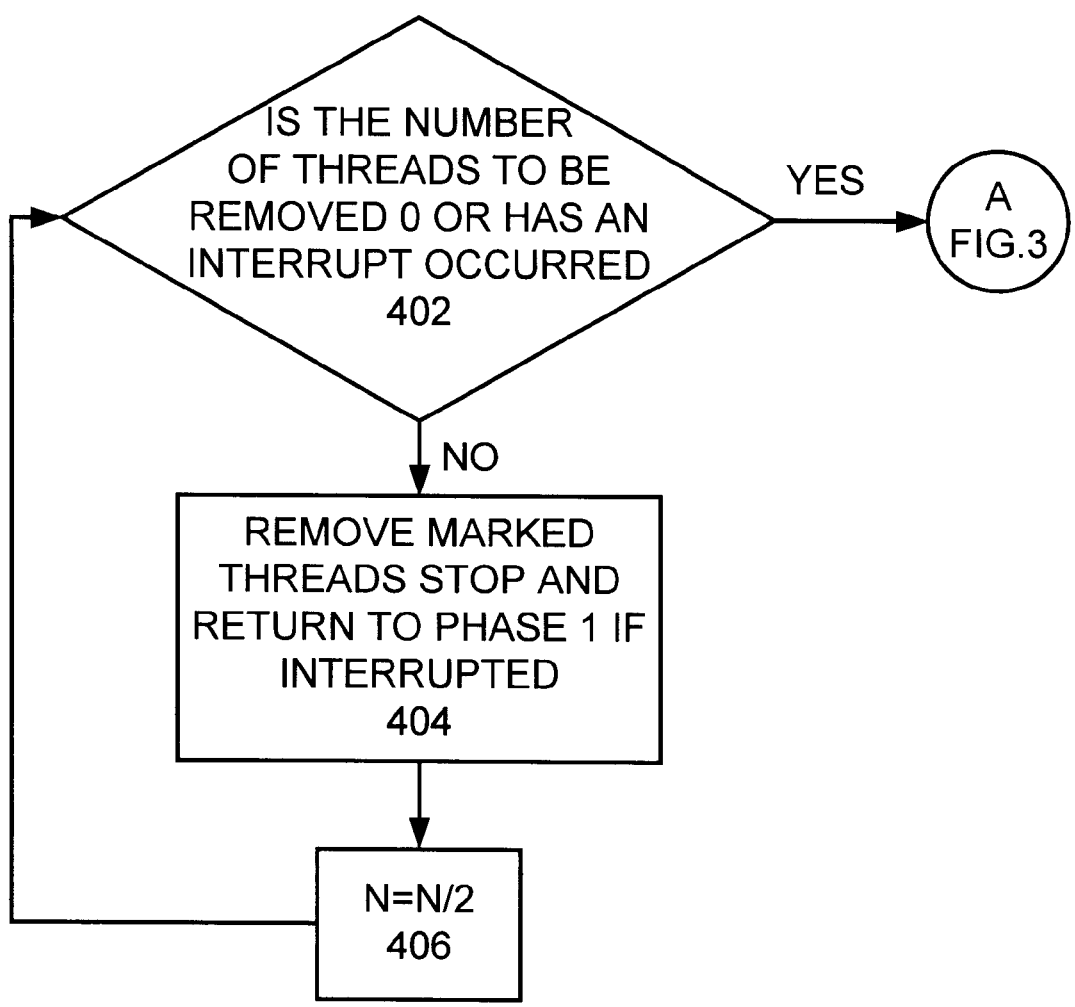
FIG. 4 is a flow chart illustrating exemplary sequential steps of a phase two of a dynamic thread pool reduction process in accordance with the preferred embodiment.

Once the threads are marked during the phase 1 steps of FIG. 3, the thread manager 132 proceeds to the second phase in FIG. 4. In between the transition from phase one to phase two, if the server thread manager senses a spurt where the number of request is larger than the X+(Y−X)/2, then the thread manager 132 can choose to abort the phase 2 commencement. This way the threads 138 remain in the pool 138, although marked as Being Removed. Such threads can merely be reused and their state changed to in use. Similarly, once phase 2 is in progress, it also can be terminated if the request surge so justifies. It is in anticipation of a sudden burst of requests coming into the server process that this mechanism is preemptable two-phase.

Referring to FIG. 4, once the phase 2 commences, the thread manager 132 iterates through this list of threads selected for removal. It will then perform the task of removing this thread marked as Being Removed. Threads 138 that are reusable need a mechanism for removal. If phase 2 does not get interrupted, it will complete removal. If interrupted after commencement, phase 2 would have at least removed one thread 138 from the pool 136.

Since this is a fixed point iterative algorithm, once phase 2 is finished, phase 1 commences again this time trying to remove (Y−X)/4 number of threads. This process continues until the required thread reduction is achieved or until the number of method requests matches the number of existing threads in which case phase 2 will abort hence aborting the reduction process. The reduction process will be triggered once again after the next lull or low activity in the number of requests.

An important feature of the invention is that this entire process of thread pool shrinkage does not affect the server's response time to incoming method requests. On the other hand, dynamically keeping the thread pool to manageable and required size enhances the servers performance by not requiring its thread manager 132 to perform unnecessary tasks. Otherwise, a lot of held system resource could well strain the system 100 hence placing the server at risk.

To remove a marked thread at block 404 in FIG. 4, the thread manager 132 sets the callback object 158 in the thread control object 150 corresponding to the particular thread 138 being deleted to NULL and ask the thread control object (TCO) 150 to resume, which resumes the thread. Then the thread 138 will go to the end of its thread function, completing the thread function and automatically terminating itself.

Figure 5:
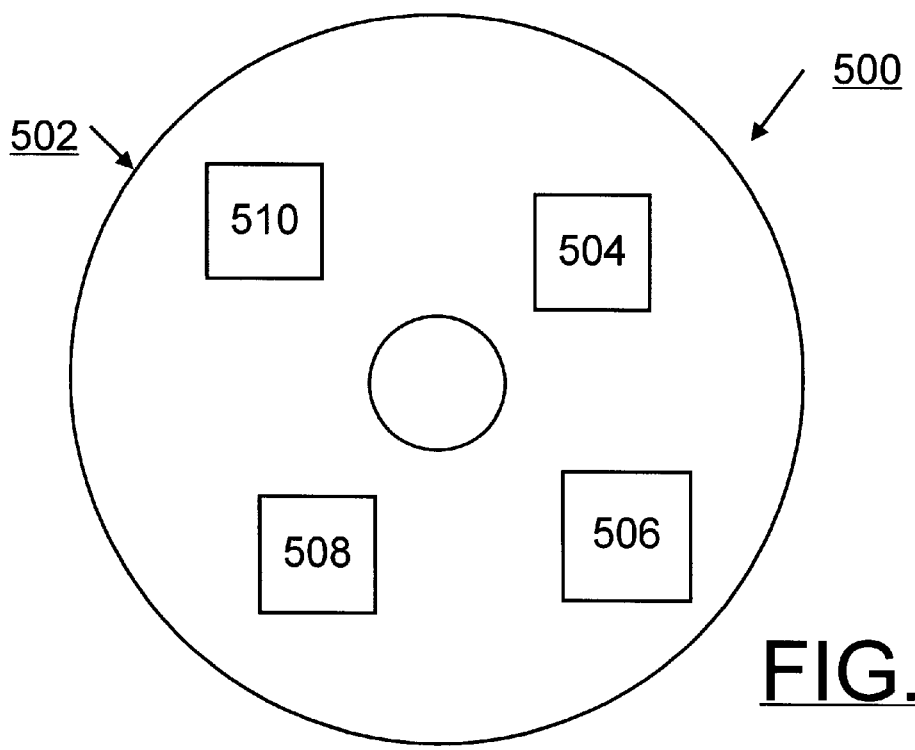
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the dynamic thread pool management methods of the preferred embodiment in the system 100 of FIGS. 1A and 1B.

A sequence of program instructions or a logical assembly of one or more interrelated modules defined by the recorded program means 504, 506, 508, 510, direct the computer system 100 to provide thread pool management of the preferred embodiment.

While the present invention has been described with reference to the details of the embodiments of the invention shown in the drawing, these details are not intended to limit the scope of the invention as claimed in the appended claims.

What is claimed is:

1. A computer program product for dynamically managing a thread pool of a plurality of reusable threads in a computer system comprising:

a recording medium;

means, recorded on the recording medium, for providing a thread manager; said thread manager for managing said plurality of reusable threads, said thread manager maintaining a count value of a number of said reusable threads in the thread pool and a thread use ratio value; and means, recorded on the recording medium, for comparing said thread use ratio value with a predefined threshold value, and responsive to said compared values, for reducing said number of said reusable threads in the thread pool; said thread pool reducing means including first means for identifying and marking reusable threads for removal from the thread pool; and second means for removing said marked reusable threads.

2. A computer program product for dynamically managing a thread pool of a plurality of reusable threads in a computer system as recited in claim 1 wherein said first means for identifying and marking reusable threads for removal from the thread pool includes means, responsive to an interrupt, for terminating operations of said thread pool reducing means.

3. A computer program product for dynamically managing a thread pool of a plurality of reusable threads in a computer system as recited in claim 1 wherein said second means for removing said marked reusable threads includes means, responsive to an interrupt, for returning to said first means for identifying and marking reusable threads for removal from the thread pool.

4. A computer program product dynamically managing a thread pool of a plurality of reusable threads in a computer system as recited in claim 1 wherein said second means for removing said marked reusable threads includes means, responsive to an identified zero number of remaining marked threads for removal, for returning to said first means for identifying and marking reusable threads for removal from the thread pool.

5. A computer program product dynamically managing a thread pool of a plurality of reusable threads in a computer system as recited in claim 1 wherein said thread pool reducing means includes means for monitoring method request activity, and responsive to an identified high activity, for terminating operations of said thread pool reducing means.

6. A computer program for dynamically managing a thread pool of a plurality of reusable threads in a computer system as recited in claim 1 wherein said plurality of reusable threads include a thread control object including a callback object and means responsive to identifying a null callback object for terminating a current thread; and wherein said second means for removing said marked reusable threads include means for setting said callback object for terminating said marked thread.

7. A computer program for dynamically managing a thread pool of a plurality of reusable threads in a computer system as recited in claim 1 wherein said thread manager maintains an idle thread queue.

8. A computer program product for managing reusable threads as recited in claim 1 wherein said thread use ratio equals a number of busy reusable threads divided by said count value of said number of said reusable threads in the thread pool, said number of busy reusable threads equals said number of said reusable threads in the thread pool less a number of reusable threads in an idle thread queue.

9. A computer-implemented method for dynamically managing a thread pool of a plurality of reusable threads in a computer system comprising the steps of:

providing a thread manager for managing said plurality of reusable threads, utilizing said thread manager, maintaining a count value of a number of said reusable threads in the thread pool and a thread use ratio value;

utilizing said thread manager, comparing said thread use ratio value with a predefined threshold value;

utilizing said thread manager, performing a thread pool reduction process for reducing said number of said reusable threads in the thread pool responsive to said compared values including a first phase of identifying and marking reusable threads for removal from the thread pool; and a second phase of removing said marked reusable threads.

10. A computer-implemented method for dynamically managing a thread pool of a plurality of reusable threads in a computer system as recited in claim 9 wherein said thread pool reduction process includes the steps of monitoring method request activity, and responsive to an identified high activity, terminating said thread pool reduction process.

11. A computer-implemented method for dynamically managing a thread pool of a plurality of reusable threads in a computer system as recited in claim 9 wherein said second phase of removing said marked reusable threads includes the steps, responsive to identifying an interrupt, returning to said phase one of identifying and marking reusable threads for removal from the thread pool.

12. A computer-implemented method for dynamically managing a thread pool of a plurality of reusable threads in a computer system as recited in claim 9 wherein said first phase of identifying and marking reusable threads for removal from the thread pool includes the steps, responsive to an interrupt, terminating said thread pool reduction process.

13. A computer-implemented method for dynamically managing a thread pool of a plurality of reusable threads in a computer system as recited in claim 9 wherein said second phase of removing said marked reusable threads includes the steps, responsive to identifying zero remaining marked threads, returning to said phase one of identifying and marking reusable threads for removal from the thread pool.

14. A thread manager for dynamically managing a thread pool of a plurality of reusable threads in a computer system comprising:

means for managing said plurality of reusable threads;

means for maintaining a count value of a number of said reusable threads in the thread pool and a thread use ratio value;

means for comparing said thread use ratio value with a predefined threshold value;

means, responsive to said compared values, for performing a thread pool reduction process for reducing said number of said reusable threads in the thread pool.

15. A thread manager for dynamically managing a thread pool of a plurality of reusable threads in a computer system as recited in claim 14 wherein said means for performing a thread pool reduction process for reducing said number of said reusable threads in the thread pool includes first means for identifying and marking reusable threads for removal from the thread pool; and second means for removing said marked reusable threads.

16. A thread manager for dynamically managing a thread pool of a plurality of reusable threads in a computer system as recited in claim 15 wherein said second means for removing said marked reusable threads includes means, responsive to an interrupt, for returning to said first means for identifying and marking reusable threads for removal from the thread pool.

17. A thread manager for dynamically managing a thread pool of a plurality of reusable threads in a computer system as recited in claim 15 wherein said second means for removing said marked reusable threads includes means, responsive to an identified zero remaining marked threads for removal, for returning to said first means for identifying and for marking reusable threads for removal from the thread pool.

18. A thread manager for dynamically managing a thread pool of a plurality of reusable threads in a computer system as recited in claim 15 wherein said first means and said second means includes means, for monitoring request activity and responsive to an identified high activity, terminating said thread pool reduction process.

\* \* \* \* \*